US010439436B2

(12) United States Patent
van Wageningen et al.

(10) Patent No.: US 10,439,436 B2
(45) Date of Patent: Oct. 8, 2019

(54) INDUCTIVE POWER TRANSFER

(75) Inventors: Andries van Wageningen, Aachen (DE); Bart Michiel De Boer, Eindhoven (NL); Christoph Loef, Aachen (DE); Lennart Yseboodt, Eindhoven (NL); Menno Anne Treffers, Eindhoven (NL); Willem Franke Pasveer, Eindhoven (NL); Eberhard Waffenschmidt, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 715 days.

(21) Appl. No.: 13/383,914

(22) PCT Filed: Jul. 9, 2010

(86) PCT No.: PCT/IB2010/053140
§ 371 (c)(1), (2), (4) Date: Jan. 24, 2012

(87) PCT Pub. No.: WO2011/007300
PCT Pub. Date: Jan. 20, 2011

(65) Prior Publication Data

US 2012/0112543 A1 May 10, 2012

(30) Foreign Application Priority Data

Jul. 13, 2009 (EP) .................................... 09165294

(51) Int. Cl.
*H02J 50/12* (2016.01)
*H02J 7/02* (2016.01)
(Continued)

(52) U.S. Cl.
CPC .............. *H02J 50/12* (2016.02); *H02J 7/025* (2013.01); *H02J 50/10* (2016.02); *H02J 50/60* (2016.02);
(Continued)

(58) Field of Classification Search
USPC .......................................................... 307/104
See application file for complete search history.

(56) References Cited

U.S. PATENT DOCUMENTS 4,082,985 A 4/1978 Bolhuis
5,549,172 A * 8/1996 Mutoh et al. ............... 180/65.1
(Continued)

FOREIGN PATENT DOCUMENTS

EP 0923182 A2 6/1999
EP 1022702 A2 7/2000
(Continued)

OTHER PUBLICATIONS

Ryuichi Kurakake et al: "Magic Surfaces: A Smart Building Material for Indoor Sensing Infrastructures", Networked Sensing Systems, 2007. INSS '07. Fourth International C onference on, IEEE, PI, Jun. 1, 2007 (Jun. 1, 2007), pp. 213-220, XP031131594.
(Continued)

*Primary Examiner* — Jared Fureman
*Assistant Examiner* — Joel Barnett

(57) ABSTRACT

The invention relates to a system for transmitting power inductively from a transmitter (11) to a receiver (10), the receiver (10) comprising a signal generator for generating a signal, triggered by an event reflecting that the receiver intends to receive power from the transmitter, wherein said signal intends to activate said transmitter from standby mode to activated mode; and comprising a signal transmitting coil (103) for transmitting said signal to said transmitter; said transmitter (11) comprising a signal receiving coil (112); a
(Continued)

detector (114) for detecting said signal received by the receiving coil; and a unit (115) for activating the transmitter from standby mode to activated mode upon the detection of said signal.

6 Claims, 5 Drawing Sheets

(51) Int. Cl.

| | |
|---|---|
| ***H04B 5/00*** | (2006.01) |
| ***H02J 50/10*** | (2016.01) |
| ***H02J 50/90*** | (2016.01) |
| ***H02J 50/80*** | (2016.01) |
| ***H02J 50/60*** | (2016.01) |
| ***H02J 9/00*** | (2006.01) |

(52) U.S. Cl.

CPC .............. *H02J 50/80* (2016.02); *H02J 50/90* (2016.02); *H04B 5/0037* (2013.01); *H04B 5/0093* (2013.01); *H02J 9/005* (2013.01); *Y10T 307/50* (2015.04)

(56) References Cited

U.S. PATENT DOCUMENTS

| | | | | |
|---|---|---|---|---|
| 5,856,710 | A * | 1/1999 | Baughman et al. | 307/10.1 |
| 5,952,814 | A * | 9/1999 | Van Lerberghe | H02J 7/025 320/108 |
| 6,700,310 | B2 | 3/2004 | Maue | |
| 6,861,785 | B2 | 3/2005 | Andre | |
| 7,170,201 | B2 | 1/2007 | Hamel | |
| 7,383,911 | B2 | 6/2008 | Schonodorf | |
| 2002/0074898 | A1 | 6/2002 | Maue | |
| 2003/0030342 | A1* | 2/2003 | Chen | H02J 50/90 310/102 R |
| 2003/0189417 | A1 | 10/2003 | Dias | |
| 2003/0210106 | A1* | 11/2003 | Cheng | H01F 3/02 333/24 R |
| 2005/0127866 | A1 | 6/2005 | Hamilton | |
| 2005/0127869 | A1 | 6/2005 | Calhoon | |
| 2007/0021140 | A1 | 1/2007 | Keyes, IV | |
| 2007/0145830 | A1* | 6/2007 | Lee | H02J 5/005 307/135 |
| 2007/0159235 | A1* | 7/2007 | Fukui | H04Q 9/00 327/537 |
| 2008/0116847 | A1 | 5/2008 | Loke | |
| 2008/0265684 | A1* | 10/2008 | Farkas | 307/104 |
| 2009/0096413 | A1 | 4/2009 | Partovi | |
| 2009/0134713 | A1* | 5/2009 | Stevens | H02J 5/005 307/104 |
| 2010/0036773 | A1* | 2/2010 | Bennett | 705/67 |
| 2010/0171369 | A1* | 7/2010 | Baarman et al. | 307/104 |

FOREIGN PATENT DOCUMENTS

| | | | |
|---|---|---|---|
| EP | 1061631 | A1 | 12/2000 |
| EP | 2043226 | A2 | 4/2009 |
| JP | 2000090221 | A | 3/2000 |
| JP | 2009159675 | A | 7/2009 |
| WO | WO2007089086 | A1 | 8/2007 |
| WO | WO2007090168 | A2 | 8/2007 |
| WO | WO2008044875 | A1 | 4/2008 |
| WO | WO2008045510 | A2 | 4/2008 |
| WO | WO2008050260 | A1 | 5/2008 |
| WO | WO2008114268 | A2 | 9/2008 |
| WO | WO2008142952 | A1 | 11/2008 |
| WO | WO2009040807 | A2 | 4/2009 |
| WO | WO2009122471 | A1 | 10/2009 |

OTHER PUBLICATIONS

J.A. Paradiso et al., "A Compact, Wireless, Self-Powered Pushbutton Controller", In Proceedings of Ubicomp '2001, pp. 299~304.

H. Green, "Self-Powered Light Switch Has No Wires", Jan. 10, 2008, Ecogeek.org, http://www.ecogeek.org/component/content/article/2170.

Wireless/Batteryless Switch Controls, http://www.lightningswitch.com/ Feb. 24, 2010.

Smith J.R. et al., "Wirelessly-Powered Platform for Sensing and Computation" Intel Research Seattle, Department of Electrical Engineering, P. Dourish and A. Friday (Eds.): Ubicomp 2006, LNCS 4206, pp. 495-506, 2006. © Springer-Verlag Berlin Heidelberg 2006.

* cited by examiner

INDUCTIVE POWER TRANSFER

FIELD OF THE INVENTION

The invention relates to an inductive power transfer system.

BACKGROUND OF THE INVENTION

Generally, inductive power transmission systems are frequently used in many applications. They allow powering of devices or charging of batteries (or capacitors) without electrical contacts.

An inductive power transmission system is realized with the help of inductive coupling, e.g. known from WO 2008/050260. Such a system in general comprises a transmitter (also referred to as "transmitting device") comprising at least one transmitter coil (also referred to as primary coil) which can be energized, thereby generating an alternating magnetic field. The inductive power system further comprises a receiver (also referred to as "receiving device") that is to be charged or powered. In order to receive power, the receiver is provided with a receiver coil (also referred to as secondary coil) coupled with the transmitter coil. The alternating magnetic field provided by the at least one transmitter coil will induce a voltage in the receiver coil. This voltage can drive a load of the receiver, e.g. charge a battery or light a lamp or power a mobile device.

Normally, in order to save power, when the transmitter does not transmit power to any receiver, the transmitter will be set to standby mode which can also be referred to as "sleeping mode" or "inactive mode". In the standby mode, the whole transmitter is powered off or at least most of the components are powered off. When the transmitter is in the standby mode, to initiate a power transmission, for example, the transmitter or a detection unit of the transmitter can be powered on regularly for detecting the presence of a receiver; and upon the detection of a receiver, the transmitter will be activated to communicate with the receiver and verify the receiver. If the receiver is a valid device, the transmitter will start the power transmission. On the contrary to the "standby mode", the status in which the transmitter is powered on for communicating with the receiver and/or transmitting power to the receiver is referred to as "activated mode".

There might be a situation in which a receiver is positioned on a transmitter for a considerable length of time without requesting power. The transmitter needs to be activated on a regular basis so as to check if the receiver needs power. It can save power by applying long time-intervals, e.g. 5 minutes or longer, for checking if the device needs power. This is not convenient if the user or the application requires fast or instantaneous activation of the wireless power. The user for example might want to have his mobile phone completely charged as long as it is positioned on the transmitter. If a call comes in, the mobile phone starts consuming power from its battery. If the hands-free mode is turned on, the power consumption will increase. In this case the transmitter has to be activated quickly to prevent the battery from becoming partly discharged.

Another example is a device that requires direct power and that has no, or only a small, battery or the like for storing energy. For example, the device might be a lamp or the like, which is switched-on by the user. In that case, the receiver has to be activated instantaneously.

OBJECT AND SUMMARY OF THE INVENTION

It is an object of the invention to propose a method and a system for activating, by means of a receiver, a transmitter which is in standby mode to activated mode.

To this end, in accordance with a first aspect, a method of transmitting power inductively from a transmitter to a receiver is proposed. In this method, the receiver comprises a signal generator and a signal transmitting coil, and the transmitter comprises a signal receiving coil. The method comprises the steps of:

- generating a signal by said signal generator, triggered by an event reflecting that the receiver intends to receive power from the transmitter, wherein said signal intends to activate said transmitter from standby mode to activated mode;
- transmitting said signal to said signal transmitting coil;
- detecting, by said transmitter, the signal received by said signal receiving coil via inducing a voltage or a current in the coil;
- activating the transmitter from standby mode to activated mode upon the detection of said signal.

In summary, the invention proposes a solution that uses a signal transmitting coil of the receiver coupled with a signal receiving coil of the transmitter to achieve that the activation (in the context of this invention, the terms "waking up" and "activating" are interchangeable) of the transmitter is initiated from the receiver side. Compared to the solution where the activation of the transmitter is initiated by the transmitter itself, for example, by detecting the presence of the receiver, the solution where the receiver initiates the wake up of the transmitter is more convenient in some situations. For example:

a. a lamp with a receiver—if the lamp is switched on using its own switch, the receiver wakes up the transmitter;
b. a mobile phone—incoming call wakes up the transmitter;
c. alarm clock/radio/wakeup light—device wakes up at a certain time;
d. laptop—laptop is turned on, or woken up from standby; status change of the laptop triggers the wake up of the transmitter.

When the above mentioned mobile devices in which the receiver resides are positioned on a transmitter and do not require power for a considerable amount of time and the transmitter goes into standby mode to save power, the above mentioned events could be used for triggering the wake up of the transmitter, without any extra action being required from the user.

The invention also proposes a system comprising a transmitter and a receiver for initiating the wake up of the transmitter by the receiver.

To this end, a transmitter is proposed comprising:

- a signal receiving coil for receiving a signal for activating said transmitter from standby mode to activated mode; and
- a detector for detecting the signal received by said signal receiving coil;
- a unit for activating the transmitter from standby mode to activated mode upon the detection of said signal.

A receiver is proposed comprising:

- a signal generator for generating a signal, when the receiver is triggered by an event reflecting that the receiver intends to receive power from the transmitter, wherein said signal intends to activate said transmitter from standby mode to activated mode, and a signal transmitting coil for transmitting said signal to said transmitter.

Advantageously, the invention proposes to use the primary coil of the transmitter as the signal receiving coil and the secondary coil of the receiver as the signal transmitting coil, thus reducing the components needed by the transmitter and receiver.

To generate the signal, the receiver needs electrical energy. The invention further proposes to use a battery or a self-powered element, i.e. an energy converter for converting mechanical energy to electrical energy.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
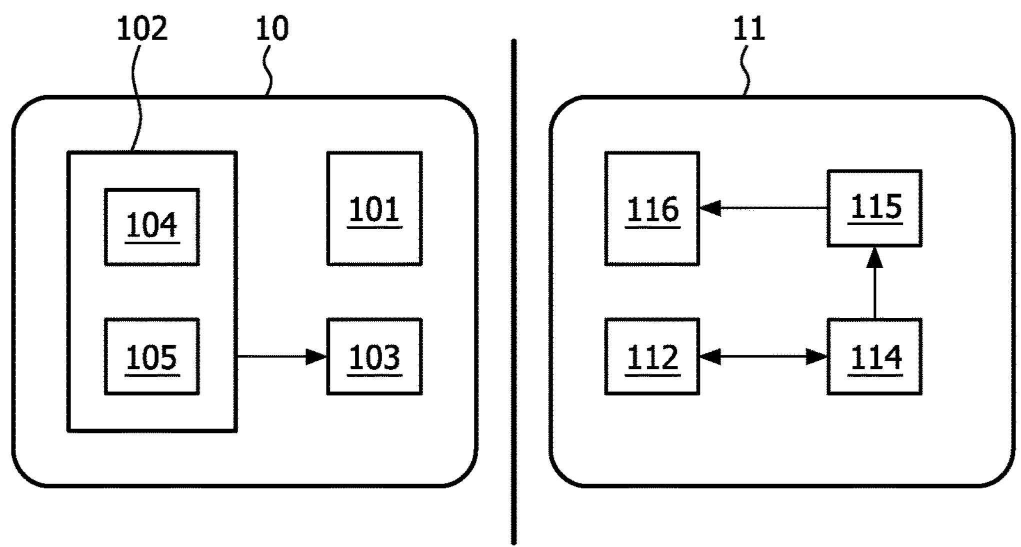
FIG. 1 depicts a block diagram of a transmission system according to an embodiment of the invention.

FIG. 1 depicts a block diagram of a transmission system according to an embodiment of the invention. The system comprises a transmitter 11 and a receiver 10. For illustrating the invention, it is assumed that the receiver 10 has been positioned on the surface of the transmitter 11 for some time without requesting power from the transmitter 11, and the transmitter 11 is in standby mode for saving power.

The transmitter 11 comprises a power transmitting unit 116 for transmitting power inductively to the receiver 10. When the transmitter 11 is in standby mode, the power transmitter unit 116 is switched off.

The receiver 10 comprises a power receiving unit 101 for receiving electric power inductively from the transmitter 11. The receiver 10 included in or connected to a mobile device is used for receiving power wirelessly from the transmitter 11 and providing the received power to the load of the mobile device. The mobile device could be, for example, a battery, mobile phone, laptop, lamp, etc.

The receiver 10 also comprises a signal transmitting coil 103, and the transmitter 11 comprises a signal receiving coil 112. The signal transmitting coil 103 is coupled with the signal receiving coil 112, i.e. the two coils are in close proximity.

If the mobile device needs the receiver 10 to receive power from the transmitter 11, firstly, the transmitter needs to be activated from the standby mode, i.e. the transmitter 11 needs to be "woken up". In other words, the status of the transmitter 11 has to be changed from standby mode to activated mode. The activated mode is the opposite of the standby mode. In activated mode, the main components of the transmitter, e.g. the transmitting unit 116, are powered on and the transmitter 11 is able to communicate and/or transmit power to the receiver 10.

To initiate the activation of the transmitter 11 by the receiver according to the invention, the receiver 10 comprises a signal generator 102 and a signal transmitting coil 103.

Figure 2:
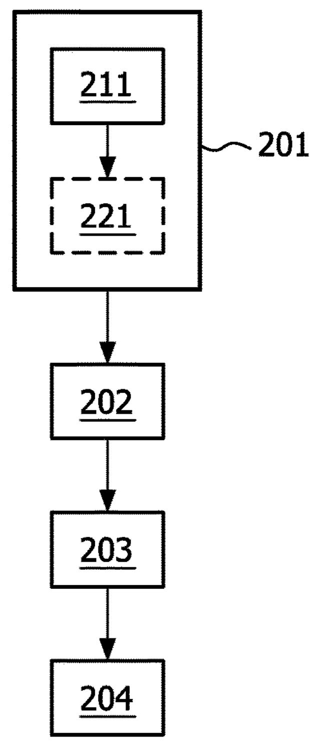
FIG. 2 depicts a flow chart for activating a transmitter by a receiver according to an embodiment of the invention.

FIG. 2 depicts a flow chart for activating the transmitter 11 from standby mode to activated mode by the receiver 10. In step 201, triggered by an event that reflects that the receiver 10 requests power, the signal generator 102 is arranged to generate a signal. The signal intends to activate (wake up) the transmitter 11 from standby mode to active mode. The generated signal is provided to the signal transmitting coil 103. In step 202, the signal is transmitted from the receiver 10 to the transmitter 11 via inductive coupling between the signal transmitting coil 103 and the signal receiving coil 112.

The event occurring in the receiver 10 could be any of many different events. For example, when the receiver 10 resides in a mobile phone, an incoming call could be an event that reflects a request for power. When the receiver 10 resides in a laptop, the status change of the laptop (e.g. changing from standby mode to wake up mode) could be an event that reflects a request for power. When the receiver 10 resides in a lamp, the turning on of the lamp could be an event that reflects a request for power. In summary, any event reflecting that the receiver needs power could be used as an event to trigger the signal generator 102 to generate a signal and provide the generated signal to the signal transmitting coil 103.

The signal generated by the signal generator 102 could be for example a voltage pulse, a series of voltage pulses, voltage steps or any other types of alternating voltage; the signal supplied to the signal transmitting coil 103 generates a magnetic field in the signal transmitting coil 103.

In order to generate a signal, the generating step 201 comprises a step 211 for providing electrical energy by a power source 104. The signal generated by the receiver 10 for activating the transmitter 11 does not have to be strong and does not have to provide the signal for a long time. Therefore, the required electrical energy for generating the signal is very low.

The power source 104 could be for example a small battery dedicated to supplying power to the signal generator 102.

Alternatively, the power source 104 could also be a load battery of the mobile device in which the receiver 10 resides. Such a load battery is used for storing power received by the receiver from the transmitter 11, and it normally will have remaining electrical energy which is sufficient for generating the signal. When the load battery is connected with the signal generator, it has to be disconnected from the power receiving unit 101 of the receiver 10.

Alternatively, the power source 104 could be an energy converter for converting mechanical energy to electrical energy. Such an energy converter includes for example a piezoelectric element or a magnetic element.

The piezoelectric element uses the piezoelectric effect to generate electric energy from mechanical energy. The piezoelectric effect (piezoelectricity) is the ability of some materials (notably crystals, certain ceramics, and biological matter such as bone, DNA and various proteins) to generate an electric field or electric potential in response to applied mechanical stress. The effect is closely related to a change of polarization density within the material's volume. If the material is not short-circuited, the applied stress induces a voltage across the material.

For example, if the receiver 10 resides in a lamp, a piezoelectric element is mechanically connected to the switch of the lamp or the switch comprises such a piezoelectric element, so that when the switch is pressed by the user (meaning that the user wants to switch on the lamp) the piezoelectric element is also pressed. As a result, electrical energy is generated. In this example, the pressing of the switch by the user is an event that reflects that the receiver needs power, and then electrical energy is converted from the mechanical energy and the electrical energy is processed into a signal, i.e. the receiver generates a signal upon the occurrence of an event.

A magnetic element typically comprises a coil and a magnet which move relative to each other. For example, a magnet is moved towards a coil. The change of the magnetic field induces a current in the coil. In the above example, if the switch of the lamp comprises a magnetic element, i.e. a magnet and a coil, and the magnet is directly or indirectly connected with a button or operation handle of the switch, then, when the user presses the button, the magnet will move relative to the coil, thus causing electric energy to be generated.

In these cases, the switch of the lamp or a similar component for receiving and converting the mechanical energy is also a component of the power source 104.

The electrical energy can be directly output by the signal generator 102 as the signal for activating the transmitter if it has the required characteristics of the signal. The characteristics of a signal could be, for example, the magnitude of the power, the amplitude of the current or voltage, the frequency of the voltage pulse, etc.

Alternatively, the signal generator 102 may comprise a unit 105 i.e. a modulator for modulating (step 221) the electrical energy provided by the power source 104. The generated energy could be modulated so as to generate a suitable signal. The modulator 105 could be for example a switch controlled by a controller. Depending on the on-off frequency of the switch, the electrical energy could be modulated to voltage pulses or other types of signal. The signal generator 102 then outputs the signal to the signal transmitting coil 103.

The transmitter 11 comprises a power transmitting unit 116 for transmitting power to the receiver. It may also comprise a communication unit for data communication with a receiver. When the transmitter 11 is in standby mode, the transmitting unit 116 and the communication unit are not energized. To wake up the transmitter 11, the communication unit and/or the transmitting unit 116 should be energized (switched on).

As mentioned above, the transmitter 11 comprises a signal receiving coil 112 for receiving the signal sent from the receiver 10. Upon receiving the signal sent from the receiver 10, the transmitter 11 will change from the standby mode to the activated mode.

The signal generated by the generator 102 generates a magnetic field in the signal transmitting coil 103, and therefore, the signal is induced in the signal receiving coil 112 which is coupled with the signal receiving coil 103. The induced signal could be for example a voltage pulse.

The transmitter 11 comprises a detector 114 for detecting (step 203) the signal received by the signal receiving coil 112.

In the above example, when the user turns on the switch of the lamp, the signal generator 102 will send a signal to the signal transmitting coil 103, which will generate a magnetic field. This magnetic field will induce a voltage in the signal receiving coil 112. The detector 114 is able to detect this voltage.

The transmitter 11 further comprises a wake-up unit 115 for activating (step 204) the transmitter from standby mode to activated mode upon the detection of said signal. In other words, the wake-up unit 115 is triggered by the detection of the signal in the signal receiving coil 112. The detector 114 and the wake-up unit 115 could be implemented by a switch e.g. a FET (Field Effect Transistors) connected to the signal receiving coil 112. The signal induced (received) in the signal receiving coil 112 switches the FET by which the transmitter 11 is activated. The detector 114 could also be implemented by any detection circuitry or sensor, and the wake-up unit 115 could be implemented by circuitry with switches controlled by software or a microprocessor.

Figure 3:
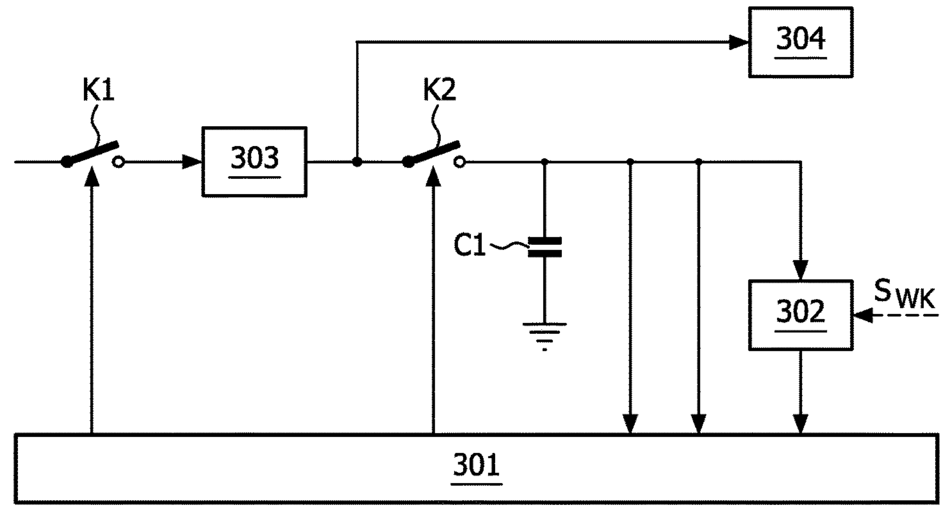
FIG. 3 depicts an example of circuitry in a transmitter for activating the transmitter.

FIG. 3 depicts an example of wake-up unit 115 for activating the transmitter. As shown in FIG. 3, the bias supply 303 which often dominates standby power dissipation is switched off by means of an AC switch K1 when the transmitter is in standby mode. During this state, only a controller 301 and the detection circuitry 302 (the detector) are powered from the energy stored in a capacitor C1. This subsystem is separated from the rest of the transmitter electronics by means of a switch K2 to ensure that only these two components are powered from the storage capacitor. A small program running on the controller periodically checks if its supply voltage, i.e. the voltage across the capacitor, is still sufficiently high. If this is not the case, both switches are closed for a short period to recharge the storage capacitor C1. In this way the controller 301 and detection circuits 302 are always powered while the rest of the components are not powered in standby mode.

The use of normally closed switches will alleviate the cold start problem, i.e. when the transmitter is first connected to the mains it will be powered completely until the controller decides that the system should enter standby mode when no device on the transmitter surface requests power or no device is present on the transmitter surface.

The transmitter is woken up when a stimulus signal $S_{WK}$, e.g. a signal, is applied to the transmitter and detected by the detection circuitry 302, which sends a signal to the controller 301 indicating that the transmitter should wake up. The controller 301 will then close both switches K1 and K2 to power the complete transmitter electronics.

Advantageously, the stimulus signal $S_{WK}$ applied should in a wireless power transmitter be indicative of the placement of a receiver on the transmitter surface.

The signal transmitting coil 103 and the signal receiving coil 112 could be dedicated coils for transmitting and receiving the signal.

Preferably, since the transmitter is in standby mode, and thus the primary coil is not used for transmitting power, the primary coil could be used as the signal receiving coil. Similarly, since the receiver 10 does not receive power from the transmitter 11 when the transmitter 11 is in standby mode, the secondary coil of the receiver 10 could be used as the signal transmitting coil 103. In other words, the function of the secondary coil of the receiver 10 and the primary coil of the transmitter 11 are reversed. This embodiment has the advantage of saving components.

If the primary coil is used as the signal receiving coil, and there is more than one transmitter coil, only one transmitter coil, which is in close proximity to the receiver, will receive the signal. Usually, only one coil will receive this voltage, such that the induced voltage does not only wake up the transmitter 11, but also provides position information of the receiver 10.

If a transmitter system consists of more than one transmitter coil, it may happen that more than one transmitter coil is woken up. Several possibilities exist:

- All cells which receive a wake-up signal become active and contribute to the power transmission. An advantage is that this method is simple to implement. However, it may happen that coils are activated which are not shielded by the receiver and therefore generate unwanted magnetic emissions. Furthermore, the power efficiency can be quite poor, because some coils can only weakly contribute to the power transmission.
- The cell which receives the largest signal becomes active.
- The cells start negotiating with the receiver and only after that the relevant cells become active.

Figure 4:
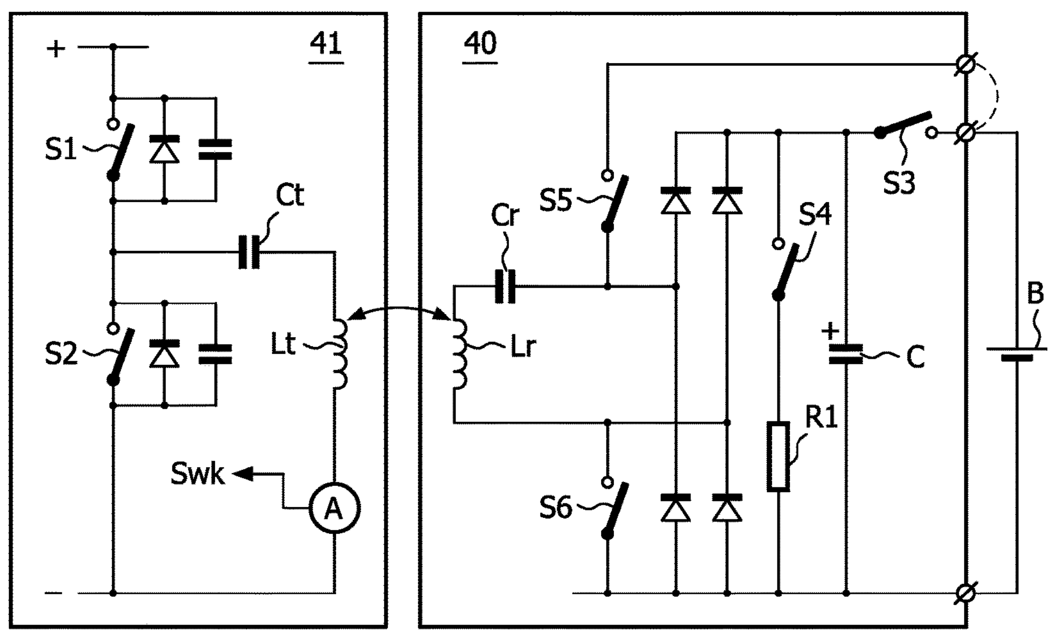
FIG. 4 depicts an example of a system for activating a transmitter by a receiver.

FIG. 4 depicts an example of the system, using the primary coil of the transmitter and the secondary coil of the receiver separately as the signal receiving coil and the signal transmitting coil.

In FIG. 4, part of a transmitter 41 is shown and part of the receiver 40 is shown. FIG. 4 is limited to only one transmitter coil, but more transmitter coils can reside within a transmitter. The transmitter coil Lt is loosely coupled to a receiver coil Lr. The transmitter contains a capacitor Ct to form a resonance circuit with the transmitter coil.

The receiver 40 contains a serial capacitor Cr to form a resonance circuit for improving the power transfer efficiency.

The transmitter 41 further contains a current sensor A that has multiple purposes. It is used to measure the required operation point in a control loop to adapt the power transfer to the needs of the receiver. It is further utilized to measure the current change in order to detect the modulation of a load by the receiver for communication of data.

The transmitter 41 further contains a half-bridge S1, S2 to drive the resonant circuit Ct, Lt, and a controller (not shown) that provides control signals to the half-bridge to set the operation parameters for the power transfer.

The receiver 40 contains a rectifier shown as 4 diodes and a capacitor C in FIG. 4. The receiver 40 further contains a load modulation entity depicted as R1 and S4 in FIG. 4 for the purpose of communicating control data to the transmitter. The switch S3 can be connected to the target load of the mobile device which could for example be a battery B, a charging unit for a battery (not shown), or a driver for one or more power LEDs (not shown).

The switches S5 and S6 are added for the purpose of generating a signal (wake-up signal) for activating the transmitter 41.

If switch S5 is briefly closed while switch S6 is also closed, a wake-up pulse current is generated that energizes the receiver's resonance circuit. Since Lr and Lt are coupled, the wake-up signal is transferred to the resonance circuit of the transmitter Lt, Ct. As a result, a current will flow through the transmitter coil Lt that is detected by the current sensor A. Preferably, the switch S2 is kept closed for this purpose. The detection of the current will trigger the wake-up circuitry as shown in FIG. 3. Alternatively, the induced voltage is directly used to trigger the wake-up circuitry. In that case the switch S2 is preferably kept open. In FIG. 4, the energy for generating the signal is drawn from the battery B. It is also possible to use another power source instead of the battery B, such as an energy converter as mentioned hereinabove.

Figure 5:
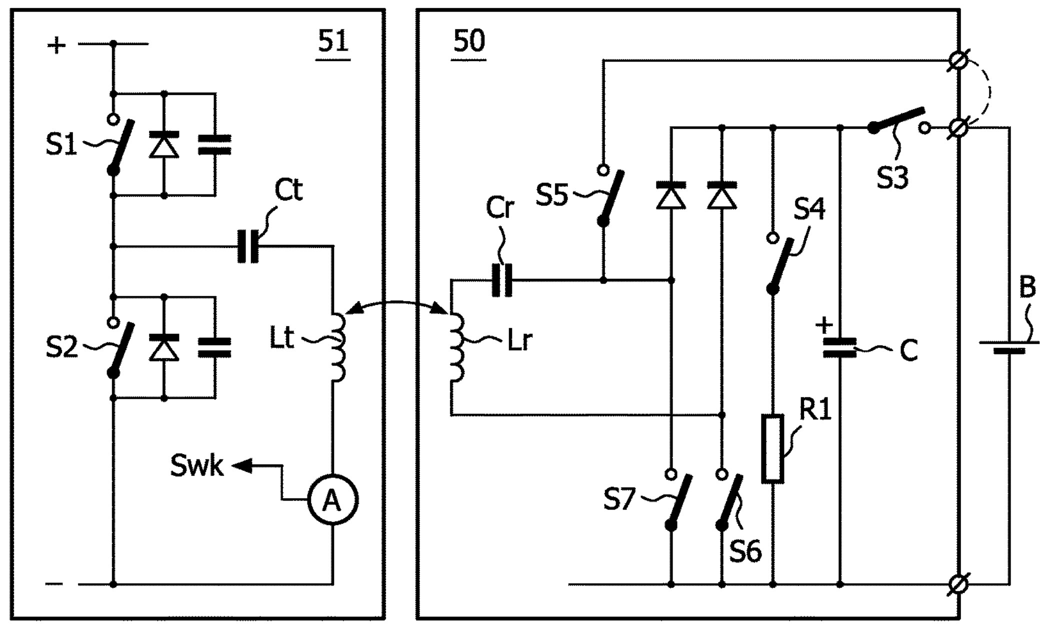
FIG. 5 depicts an example of a system for activating a transmitter by a receiver.

The signal can be extended to a pulse frequency that corresponds to the resonance frequency as determined by the (coupled) transmitter resonance circuit. This will allow increasing the signal level at the transmitter. In addition, the transmitter can contain a frequency filter that is designed for passing the frequency of the signal and blocking other frequencies. FIG. 5 shows an embodiment with a half synchronous rectifier. The lower half diodes are replaced by switches (S6 and S7). A controller circuit (not shown) controls the switching of these switches for the purpose of rectification. In this embodiment only one extra switch is needed for generating the wake-up signal. Switch S6 needs to be closed while switch S5 is briefly closed for generating a signal.

Figure 6:
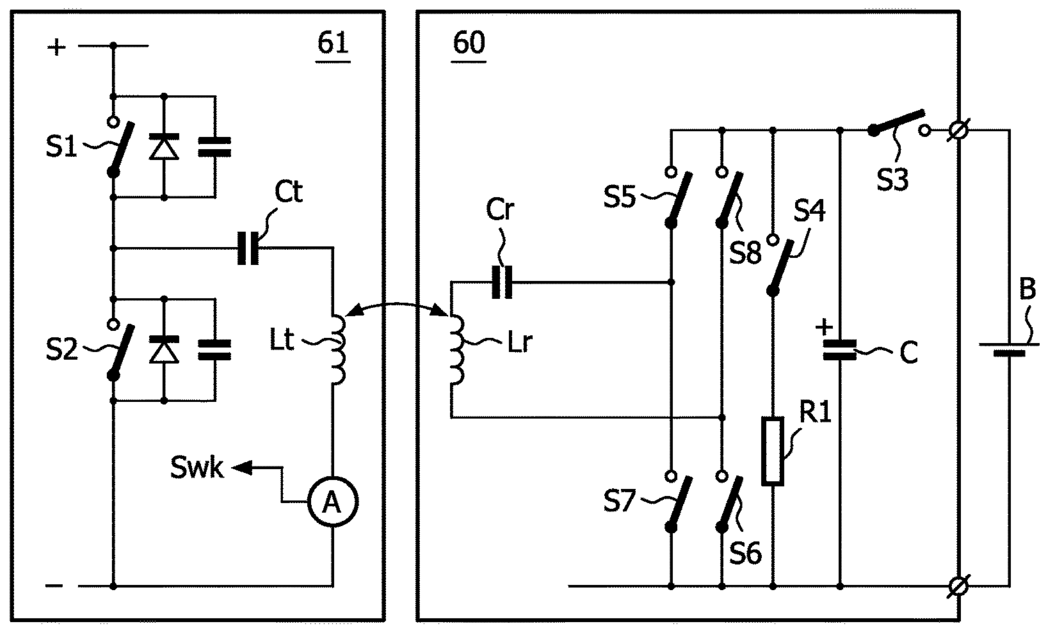
FIG. 6 depicts an example of a system for activating a transmitter by a receiver.

FIG. 6 shows an embodiment with a full synchronous rectifier. All diodes are replaced by switches (S5, S6, S7, S8). In addition to Switch S6, switch S3 needs to be closed while switch S5 is briefly closed for generating a pulse. In this embodiment no extra components are required for generating the signal.

Figure 7:
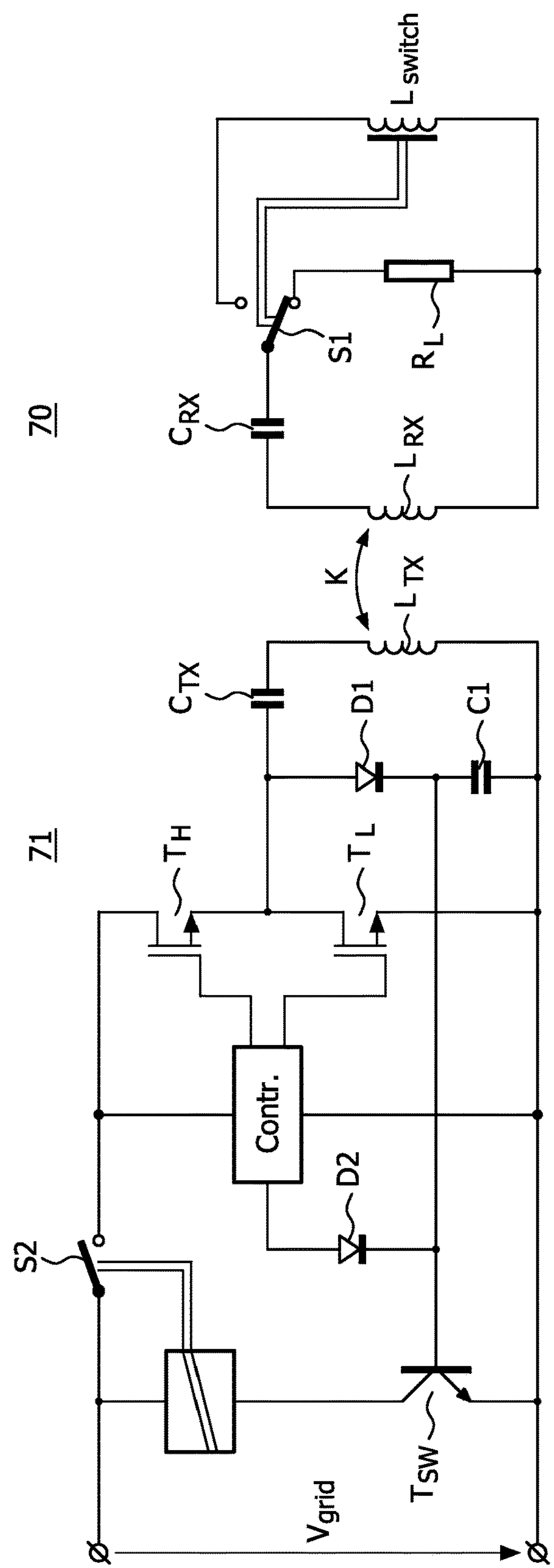
FIG. 7 depicts an example of a system for activating a transmitter by a receiver.

FIG. 7 shows another embodiment of the invention. The switch Lswitch is in this case an inductive switch, e.g. a switch with a piezoelectric element. The switch Lswitch is mechanically coupled to an electrical switch $S_1$. Usually, $S_1$ connects the load of the receiver, represented by $R_L$, to the receiver circuit consisting of the receiver coil $L_{Rx}$, and the resonant capacitor $C_{Rx}$, such that the load can receive the power. The switch Lswitch is disconnected, so that it doesn't consume power. When the switch Lswitch is used, also $S_1$ is altered. Next, the receiver coil is connected to the switch Lswitch, but disconnected from the load. This way, the generated voltage is passed to the coil of the receiver $L_{Rx}$, but it will not affect the load $R_L$.

The voltage pulse will generate a magnetic pulse, which induces a voltage in the coil of the transmitter $L_{Tx}$. In standby mode, the switch $S_2$ is open, and transistor Tsw has no base voltage and is open. The circuit has no power consumption. Furthermore, the two switches of the generator, represented by the Field Effect Transistors (FET) $T_H$ and $T_L$, are open. The induced voltage pulse passes through $C_{Tx}$ and diode $D_1$ and charges capacitor $C_1$, such that the voltage rises above the threshold voltage of the base diode of Tsw, causing Tsw to become conductive. Even if the induced voltage pulse has ended, the capacitor $C_1$ continues to provide a voltage for some time. If Tsw conducts, switch $S_2$ is closed and the transmitter circuit is powered from the grid voltage Vgrid. Soon, the controller provides a further voltage along $D_2$ to keep Tsw conductive. Then the controller starts to switch the power transistors $T_H$ and $T_L$ alternately to generate ac current in the transmitter circuit and transfer power. In a more advanced embodiment, the controller doesn't start with the power transmission immediately, but communicates with the receiver to decide whether power should really be switched on. The communication means is not shown in the Figure. The power is only switched on if the receiver can identify itself as a valid receiver and all further necessary parameters are exchanged. If the receiver cannot validate itself, the transmitter cell goes into standby condition again. In the embodiment presented in FIG. 7, the controller switches off the voltage at $D_2$. Soon, $C_1$ is discharged and Tsw opens. Then, the system is in stand-by mode.

Figure 8:
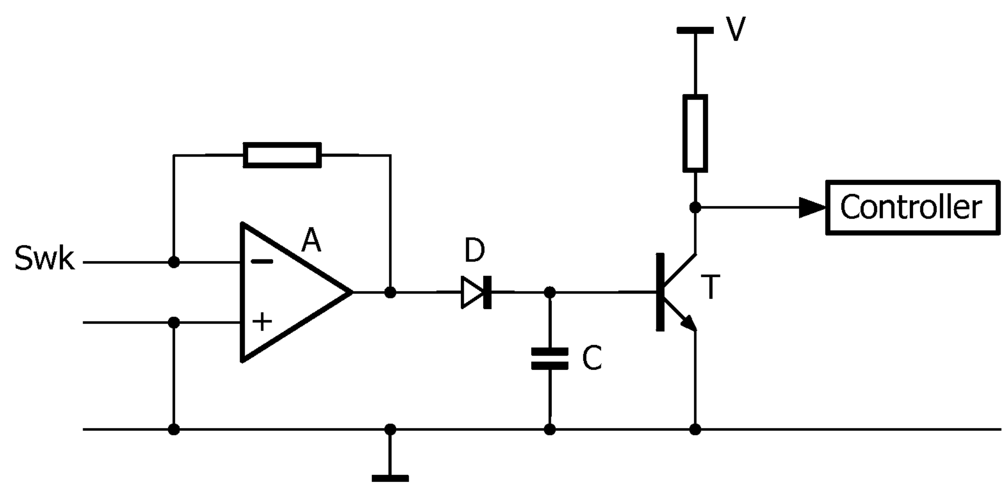
FIG. 8 depicts an example of signal detection circuitry for activating the controller in the transmitter.

FIG. 8 depicts an example implementation of a detector. If no wake-up signal is present, the signal to the controller is equal to the DC voltage V. A weak wake-up signal Swk is amplified by the operational amplifier A. The amplified signal charges a capacitor C via a diode D. If the voltage in the capacitor reaches a threshold, the transistor T will pull the voltage down to ground and triggers the controller to power on (activate) the transmitter.

It is to be noted that the invention may be implemented in hardware and/or software, using programmable components. It will be appreciated that in the above description, for clarity, embodiments of the invention are described with reference to different components, functional units and processors. However, it will be apparent that any suitable distribution of functionality between different functional units or processors may be used without deviating from the invention. For example, functionality illustrated to be performed by separate units, processors or controllers may be performed by the same processor or controller. Hence, references to specific functional units are only to be seen as references to suitable means for providing the described functionality rather than as indications of a strict logical or physical structure or organization.

Although the present invention has been described in connection with some embodiments, it is not intended to be limited to the specific form set forth herein. Additionally, although a feature may appear to be described in connection with particular embodiments, one skilled in the art will recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category, but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims that are provided merely as a clarifying example shall not be construed as limiting the scope of the claims in any way.

The invention claimed is:

1. A transmitter for transmitting electric power to a receiver inductively, the transmitter comprising:

a primary coil configured for inductive coupling with a secondary coil located in the receiver;

a detection circuit connected to the primary coil and configured to detect an activation signal, such that when the receiver requests electric power from the transmitter the activation signal is generated by the receiver and provided to the secondary coil to be transmitted, via inductive coupling, to the primary coil; and a wake-up circuit comprising a capacitor, wherein the wake-up circuit is configured to wake up the transmitter when the activation signal is detected such that the transmitter is changed from a standby mode to an activated mode, wherein in order to save the electric power the transmitter is changed into the standby mode from the activated mode when the receiver does not require power, wherein in the standby mode the detection circuit is powered by the capacitor; and wherein the transmitter is configured to reverse a function of the primary coil when the transmitter is in the activated mode, such that the primary coil inductively transmits the electric power to the secondary coil of the receiver.

2. The transmitter as claimed in claim 1, wherein a switch separates the detection circuit from at least one other component of the transmitter.

3. A system for transmitting electric power inductively, comprising:

a transmitter that includes:

a primary coil configured for inductive coupling with a secondary coil;

a detection circuit connected to the primary coil and configured to detect an activation signal; and a wake-up circuit comprising a capacitor, wherein the wake-up circuit is configured to wake up the transmitter;

a receiver that includes:

a signal generator for generating the activation signal;

the secondary coil being connected to the signal generator;

wherein when the receiver requests the electric power from the transmitter the activation signal is generated by the receiver and provided to the secondary coil to be transmitted, via inductive coupling, to the primary coil of the transmitter, wherein the transmitter is changed from a standby mode to an activated mode when the activation signal is detected, wherein in order to save the electric power the transmitter is changed into the standby mode from the activated mode when the receiver does not require power, wherein in the standby mode the detection circuit is powered by the capacitor, and wherein the transmitter is configured to reverse a function of the primary coil when the transmitter is in the activated mode, such that the primary coil inductively transmits the electric power to the secondary coil of the receiver.

4. A method of transmitting electric power inductively from a transmitter to a receiver, the transmitter comprising a detection circuit and a wake-up circuit, the method comprising:

inductively coupling a primary coil of the transmitter with a secondary coil of the receiver;

generating an activation signal by the receiver when the receiver requests the electric power from the transmitter;

providing the activation signal to the secondary coil to be transmitted, via inductive coupling, to the primary coil of the transmitter;

detecting, by the detection circuit, the activation signal present in the primary coil;

waking up, by the wake-up circuit that comprises a capacitor, the transmitter when the activation signal is detected such that the transmitter is changed from a standby mode to an activated mode, wherein in order to save the electric power the transmitter is changed into the standby mode from the activated mode when the receiver does not require power, wherein in the standby mode the detection circuit is powered by the capacitor; and reversing a function of the primary coil when the transmitter is in the activated mode, such that the primary coil inductively transmits the electric power to the secondary coil of the receiver.

5. The method as claimed in claim 4, wherein generating further comprises:

providing electrical energy; and modulating the electrical energy to the activation signal.

6. A method of transmitting electric power inductively from a transmitter to a receiver, the transmitter comprising a detection circuit and a wake-up circuit, the method comprising:

requesting the electric power from the transmitter;

generating an activation signal;

transmitting, by a secondary coil of the receiver, the activation signal to a primary coil of the transmitter;

detecting, by the detection circuit, the activation signal present in the primary coil;

waking up, by the wake-up circuit that comprises a capacitor, the transmitter when the activation signal is detected such that the transmitter is changed from a standby mode to an activated mode, wherein in order to save the electric power the transmitter is changed into the standby mode from the activated mode when the receiver does not require power, wherein in the standby mode the detection circuit is powered by the capacitor; and receiving, via inductive coupling, the electric power provided by the primary coil of the transmitter in response to the activation signal.

* * * * *